United States Patent [19]

Brenner et al.

[11] Patent Number: 5,881,227
[45] Date of Patent: Mar. 9, 1999

[54] USE OF DAEMONS IN A PARTITIONED MASSIVELY PARALLEL PROCESSING SYSTEM ENVIRONMENT

[75] Inventors: Larry Bert Brenner, Austin, Tex.; Kenneth Charles Briskey, Hyde Park; Krystal Kay Rothaupt, Rhinebeck, both of N.Y.

[73] Assignee: International Business Machines Corporation, Armonk, N.Y.

[21] Appl. No.: 664,689

[22] Filed: Jun. 17, 1996

[51] Int. Cl.$^6$ ..................................................... G06F 13/00
[52] U.S. Cl. ............................... 395/200.3; 395/200.31; 395/200.8
[58] Field of Search ........................... 395/200.3, 200.31, 395/200.35, 200.52, 200.57, 200.8

[56] References Cited

U.S. PATENT DOCUMENTS

| | | | |
|---|---|---|---|
| 3,641,505 | 2/1972 | Artz et al. ................................ | 395/280 |
| 4,511,964 | 4/1985 | Georg et al. ............................. | 711/202 |
| 5,129,077 | 7/1992 | Hillis ....................................... | 395/500 |
| 5,257,369 | 10/1993 | Skeen et al. ............................. | 395/680 |
| 5,339,392 | 8/1994 | Risberg et al. .......................... | 345/333 |
| 5,353,412 | 10/1994 | Douglas et al. ..................... | 395/200.73 |
| 5,367,701 | 11/1994 | Von Gnechten et al. ................ | 711/117 |
| 5,381,534 | 1/1995 | Shi .......................................... | 395/200 |
| 5,446,848 | 8/1995 | Whitlock et al. ....................... | 395/280 |
| 5,455,948 | 10/1995 | Poole et al. ............................. | 707/102 |
| 5,457,797 | 10/1995 | Butterworth et al. .................. | 395/682 |

FOREIGN PATENT DOCUMENTS

| | | |
|---|---|---|
| 2065521 | 10/1993 | Canada . |
| 0708402 | 4/1996 | European Pat. Off. . |

OTHER PUBLICATIONS

Dinella et al., "Use of Named Pipes in Reverse Fashion," IBM Technical Disclosure Bulletin vol. 36, No. 08, Aug., 1993, p. 205.

"IBM Loadleveler Administration Guide," IBM Manual, SH26-7220-02, Oct., 1994, pp. 1-222.

Primary Examiner—Eric Coleman
Assistant Examiner—Mackly Monestime
Attorney, Agent, or Firm—Lily Neff

[57] ABSTRACT

A method of deciphering all communications for a given sub-environment in a partitioned parallel processing environment is suggested through the use of daemons. The parallel processing environment is a UNIX based operating environment comprising of a plurality of nodes connected through a network to one another and to a central control element used for controlling all communications. The parallel processing environment initially operates as a single computing unit, which is later partitioned into two or more isolated sub-environments. The method comprises of storing all system data in a repository provided in the central control element, each data being organized as belonging exclusively to one sub-environment, or globally to all sub-environments. The central control element is then apportioned, so that the data belonging exclusively to one sub-environment is located at a given address, each sub-environment being assigned a different address. A dedicated daemon is then started in the central control element for each sub-environment. The daemon is provided its respective sub-environment's address in the central control element. The daemon "listens" in and deciphers all communications, only returning back those communication pertaining to its sub-environments back to the nodes of its respective sub-environment.

10 Claims, 4 Drawing Sheets

USE OF DAEMONS IN A PARTITIONED MASSIVELY PARALLEL PROCESSING SYSTEM ENVIRONMENT

FIELD OF THE INVENTION

This invention relates to an apparatus and method for partitioning massively parallel processors, in particular those operating in a UNIX based environment, into a plurality of logical units while protecting the existing software installed on the system.

BACKGROUND OF THE INVENTION

The rapid evolution of information technology in recent years, hand in hand with the commercial availability of powerful and sophisticated microprocessors had resulted in the increasing use of parallel processors.

The parallel processing architecture involves the use of many interconnected processors to access large amounts of data. In a massively parallel processing system (MPP system, hereinafter), a relatively large number of, separate though relatively simple, microprocessor based processing elements are interconnected to simultaneously process a large number of tasks at speeds far exceeding those of conventional computers. Though the MPP system is composed of many nodes, the nodes are viewed and function in many ways as one single resource. The grouping of all nodes into a single resource creates advantages in increased capacity and speed. However, this grouping has several key limitations which are of immediate concern.

A first limitation deals with the issue of workload management. Often the users of most large MPP systems require the ability to customize different sets of nodes with different combinations of software in order to manage workload interference. For example, n nodes may be used for processing a parallel data base system, while the remaining nodes are to be used for processing a serial batch application. A parallel processor can run many jobs at once; but each job competes for node and network resources. This is particularly of interest where a switch, such as a High Performance Switch (hereinafter an HPS) is being used. In such instances it is possible for one job to monopolize the switch and thus impact another job using the same switch. Therefore, a need arises for isolating the switch traffic in one environment from the switch traffic in another environment.

Furthermore, many of the MPP systems at present require that all nodes run on the same version of code, also using the same operating system and support programs, which makes customization and workload management difficult, if not impossible.

Using the same version of the code, the same operating system and same support programs can also create migration concerns. This "sameness" requirement can make upgrading the system to a new level of code, a potentially long and risky task, because the users are often forced to upgrade each node to the new levels at the same time. In addition, the users are often forced to install new levels of related software tools as well as their own applications on each node. When and if an error ensues, the users need to reinstall the old levels of code back on each and every affected node and perhaps the entire system, a process known as backing off the new levels of the upgrade.

Furthermore, in many instances users require the capability of testing new levels of software, (such as AIX and LPPs) user applications, and tools, on a system which is currently running a workload without disrupting the production workload. It is, therefore, desirable for the users to test new levels of code on a small number of nodes, while other nodes are unaffected, to avoid disrupting the entire production system. This is particularly important when the new levels of code or upgrade are unfamiliar to the user in their functionality, and perhaps incompatible to other already installed applications.

Akin to the non-disruptive migration requirements, users may require the capability to create multiple production environments with the same non-interfering characteristics. These environments must be sufficiently isolated so that the workload in one environment is not adversely affected by the workload in the other, especially for services whose usage is not monitored and charged for, but which have critical implications on job performance.

As a consequence, in all of the above mentioned situations and other related ones, it would be desirable to be able to "carve out" parts of the system that can run jobs without interfering with each other. This "carving out" process is known as partitioning, as appreciated by those skilled in the art. Partitioning in general is the ability to divide up system resources into groups or parts in order to facilitate particular management functions. The structure of the MPP system provides the opportunity to partition the system into groups of nodes for various purposes.

While there are capabilities at present to perform and maintain successful partitioning in MPP systems, tools are still needed that can easily perform all aspects easily and simultaneously, namely the ones mentioned earlier—workload management, non-disruptive migrations and management of multiple production environments. For example, LoadLeveler program of International Business Machines (IBM) Corp. currently addresses some requirements for workload partitioning, but several other concerns remain unaddressed. In particular, tools are needed to easily form and manage installation of a group of nodes as a single entity, while allowing each partitioned unit to maintain its unique characteristics.

Furthermore, any attempt to partition an MPP system must be designed such that it particularly protects system software and applications from unnecessary changes, while presenting a consistent system model for new code. In addition, the users' need to create multiple production environments with the same non-interfering characteristics that are sufficiently isolated (so that one environment does not adversely affect the working of other environments), needs to be addressed.

The present application is related to the following applications filed on the same day—attorney dockets: P09-96-072, P09-96-073 and P09-96-074.

SUMMARY OF THE INVENTION

The present invention provides for a method of deciphering all communications for a given sub-environment, in a partitioned parallel processing environment, through the use of daemons. The parallel processing environment is a UNIX based operating environment comprising of a plurality of nodes connected through a network to one another and to a central control element used for controlling all communications. The parallel processing environment initially operates as a single computing unit, but is later partitioned into two or more isolated sub-environments.

All system data is stored in a repository provided in the central control element. The data is further organized, accordingly, as belonging to one environment or another, with certain portions of data being shared between all sub-environments. The central control element is apportioned accordingly and data belonging to each sub-environment is mapped to these apportioned areas in a manner that each portion, defined by an address, is designated for a sub-environment. In one embodiment, this apportionment is performed through the use of a communication adapter and dedicated servers located in the central control element. In this embodiment, it is the adapter that is apportioned into parts, with each portion being dedicated to different sub-environments.

A destination file is provided in each node. The destination file contains the address of adapter portion for the sub-environment for which the node resides in. A dedicated daemon is then started, for each sub-environment, in the central control element. The daemon "listens" in on the address provided on the servers and adapter for its respective sub-environment and deciphers all communications, returning only those that pertain to its respective sub-environment.

DESCRIPTION OF THE DRAWING

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
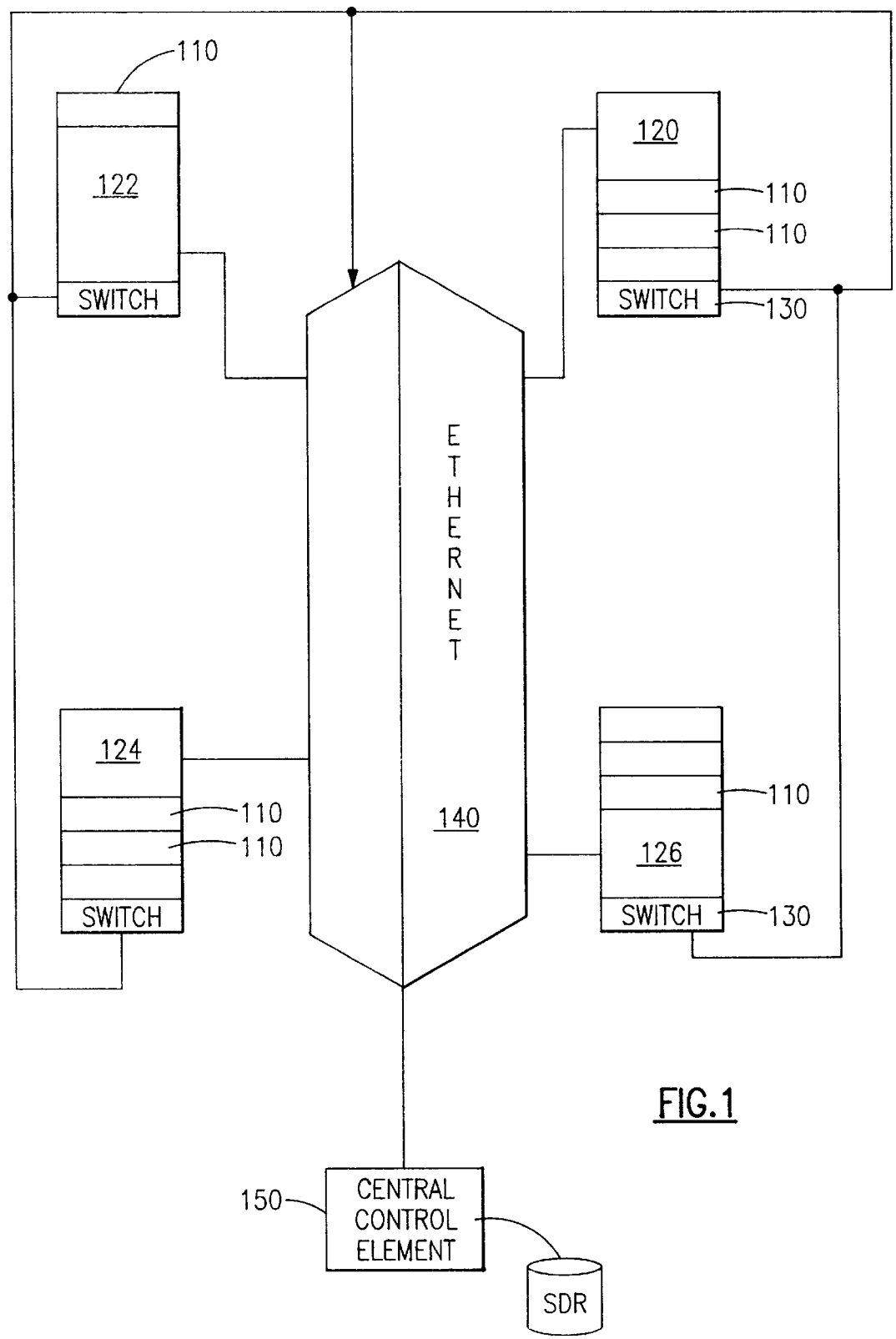
FIG. 1 is an illustration of a distributed parallel system such as the one discussed in this application.

FIG. 1 illustrates a massively parallel processing (MPP) system at 100, such as the IBM RISC System/6000 Scalable Power Parallel System 2 (hereinafter SP2), operating in a UNIX based environment as used in one embodiment of the present invention. This section often discusses the concepts of the present invention in relation to IBM's SP2 by way of example and as provided by one embodiment of the present invention. However, the concepts of the present invention, as outlined in this section, are not limited to the use of IBM's SP2 and can be applied to other similar massively and distributed parallel processing system environments, in particular those that operate in a UNIX based environment.

In IBM SP2, as illustrated in FIG. 1, a plurality of nodes shown at 110 and preferably between 2 and 128 nodes, are assembled for the purpose of running parallel as well as scalar jobs. As shown, often nodes in the system environment of FIG. 1 at 100, are connected to one another and to other resources via a network, such as an ethernet shown at 140. In one embodiment of the present invention, the ethernet uses a TCP/IP protocol. The nodes can be grouped together in one or more frames at 120, 122, 124, and 126. The system environment is controlled by at least one hardware monitor, at one point of control, as shown at 150. The point of control (hereinafter central control element) is a reference point where all communications are controlled and the system status is always accurately updated. The central control element is also comprised of at least one active physical control workstation (hereinafter control workstation), not shown in FIG. 1. The central control element is in processing communication with the nodes through the network (ethernet). It should also be noted that the MPP system is usually identified by its control workstation's name.

When a communication switch is provided as part of the system environment, such as illustrated in FIG. 1, the switch at 130 is physically connected to all of the nodes. Furthermore, it is possible that more than one switch is used. For example, one switch can be provided per frame, or even groups of frames may share a switch.

In the embodiment shown in FIG. 1, the nodes are also connected to each other through their switches (such as an HPS switch) as well as through the ethernet network at 180. In this manner, the nodes are in processing communication with one another in two ways, through the ethernet network and directly through the switches. The switches are also connected to the ethernet network. However, in the embodiment shown in FIG. 1, the switch network is only in processing communication with the central control element through the ethernet network alone. Nonetheless, in other embodiments, if desired the switch network can be also connected directly to the central control element.

As explained earlier, many MPP systems requires that the operating code be maintained at the same level along all nodes. Similarly the same version of the operating system or application tools have to be supported by all nodes. As an example, in an SP2 machine, the system is confined to run the same version of AIX operating system and Parallel System Support Program (PSSP) LPP. (The PSSP LPP is the system management code that configures and manages the SP2 as a single system.) However, as discussed earlier, this leads to migration problems. In addition, in instances where the users require to run different production environments, simultaneously and side by side, different levels of code and/or separate operating systems and application tools may be required. Therefore, to address the non-disruptive migration concern and multi-production requirements as well as workload management issues discussed earlier, it would be desirable to partition the system into different sub-environments.

Partitioning involves the creation of logical (SP) systems from the systems' point of view to support different levels of code and application tools when necessary. Therefore, while each node in a partition share the same level of code, different partitions can run different levels of code and applications. A logically partitioned SP is a logical subset of nodes in one or more frames, and for systems with a switch such as an HPS, a logical subset of the HPS switches.

Figure 2:
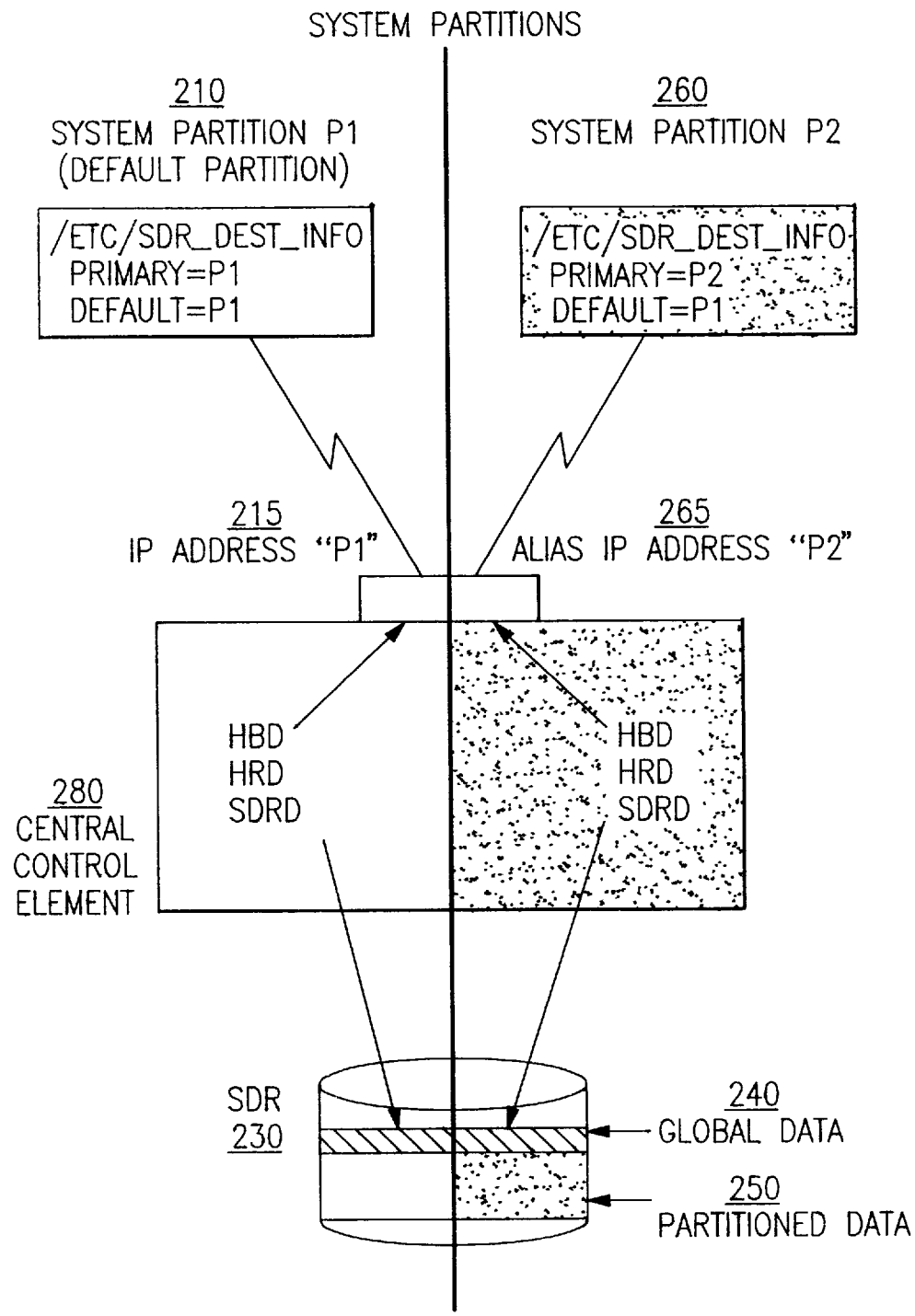
FIG. 2 is an illustration of one system unit partitioned into two sub-environments.

FIG. 2 is an illustration of a partitioned SP system such as the one discussed in the embodiment of FIG. 1. In FIG. 2, the SP system has been partitioned into two sub-environments, the default partition or sub-environment shown at 210, and a second partition P2 at 260. Each partition 210 and 260, can include one or even a group of non-overlapping nodes which appear to most MPP sub-systems (and for most logical tasks) as separate logical systems. In other words, each partition looks and feels like a real and separate (SP) system to almost all user tasks.

From an administrative point of view, each system partition in FIG. 2 is a logical SP system within one administrative domain. This means that the hardware monitor provides the capability to control and monitor the entire system or a system partition. No hardware additions or further changes are required to be made in order to accomplish logical partitioning.

The entire partitioned system of FIG. 2 continues to be managed from a single point of control via the central control element at 150. Since switches are also being used here, partitioning the system involves partitioning the switches. Furthermore, whenever a switch is being used, a topology file has to be created for each system partition. Both switch initialization and topology files for each system are contained within each system partition. In addition, switch faults and message traffic are also contained within each system's partition.

In partitioning the system, certain information including the existing software, vendor products and applications, has to be kept protected from unnecessary changes. In fact under the present invention most of the system code can remain unaffected. To much of the application code and system management code, working inside a system partition is exactly the same as working (outside the partition) on the complete processing system. Only system management functions that actually need to manage the system partitions or those that need to provide flexibility to work outside or inside the specific partition boundaries require knowledge of such partitioning. To the rest of the system and even possibly the user, the existence of such partitioning is transparent.

Figure 3:
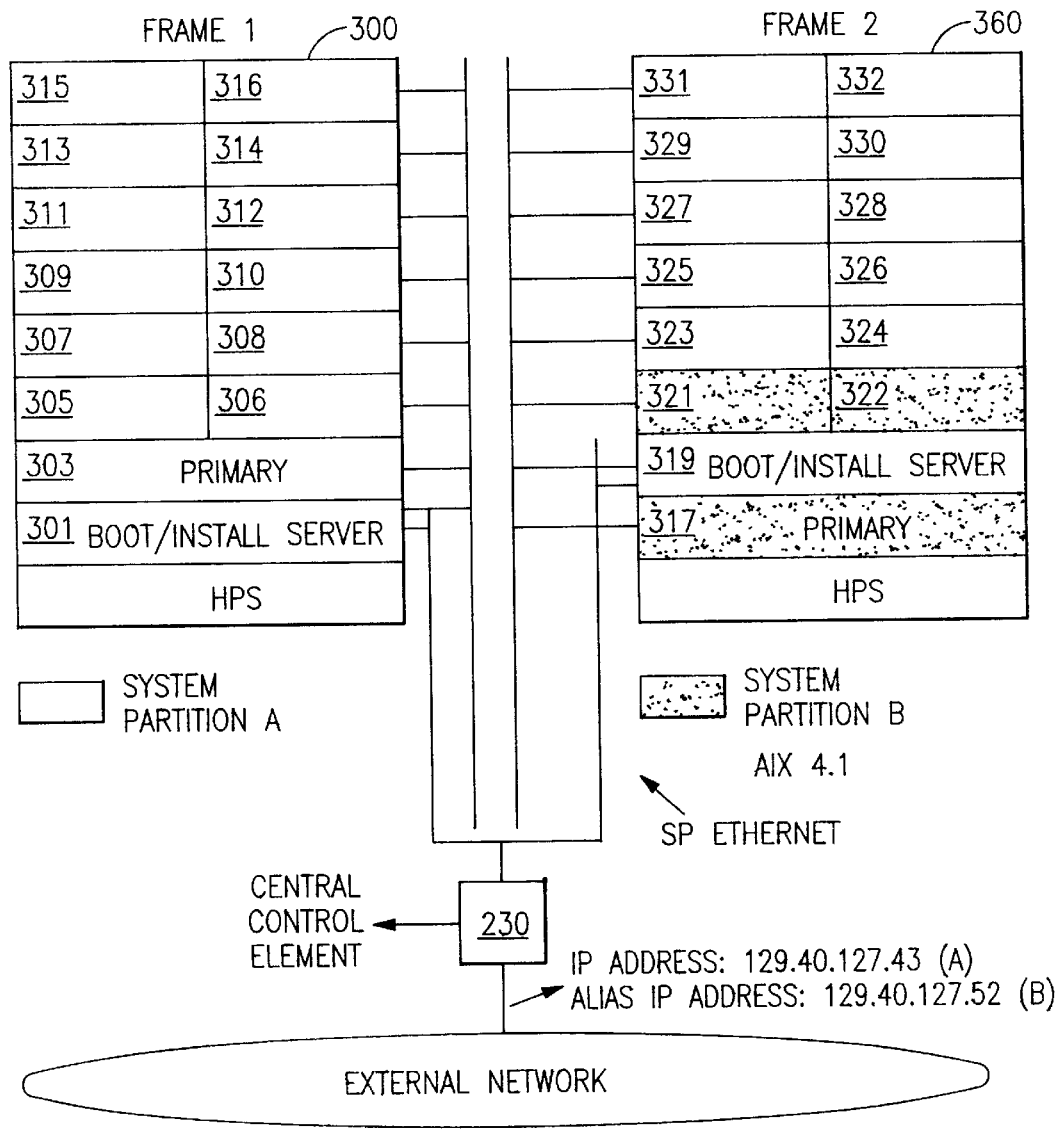
FIG. 3 is another illustration of a partitioned system unit.

To accomplish system partitioning effectively, in the manner described above, two concepts of the present invention need to be discussed at length and separately. These concepts as relating to partitioning encompass data classification through system management database, and the presentation of multiple sub-environment views as implemented by adapter aliases. Both concepts are discussed below in some detail. FIGS. 2 and 3 reflect the use of these two concepts.

Furthermore, to protect data integrity and the isolation of sub-environments, the processing environment has to be able to recover from a failure or shut-down completely, preserving or restoring its partitioned environments upon recovery. In short, system partitioning must be "persistent", meaning that after a system shutdown the partitions must remain intact. A detailed description of "persistent" partitioning, as accomplished by the present invention, will also be provided after other related concepts are discussed below.

System Management Database

Creating the illusion of a logical partition starts with the concept of data sharing. Within an SP2 system, this concept of data sharing starts with the use of a repository located in the central control element. The System Data Repository as shown in FIG. 2 at 230, is used for storing data pertaining to the entire (SP) system. The SDR contains all configuration data that describes an SP2 system. Software subsystems rely on this data to understand the configuration of the SP2 system.

To create multiple logical sub-environments within a single SP2 system unit, the SDR is partitioned in a manner as to provide separate logical views to the software subsystems. In that way, none of the subsystems need to be partition-aware if they don't need to. To maintain single point of control capability for the entire system, the SDR provides interfaces to request information about the entire system.

The SDR stores SP2 system management data persistently in logical groups called "classes". Each class can contain "objects". Objects contain system management data specific to the SP2. As illustrated in FIG. 2, a global class at 240 is one where all of the objects are available and visible to all interested parties on any nodes in the MPP (SP2) system. When there are no logical partitions (prior to the design of the present invention), the SDR classes were all considered to be "global".

To accommodate system partitioning, the SDR in the present invention, allow for a plurality of classes, namely "system" classes at 240, and "partitioned" classes at 250. The system classes are similar to the traditional global classes in that they can be accessed from anywhere in the MPP system and the view of the objects is always the same. Usually data which is usually most pertinent to the physical configuration and the hardware, is considered global data for the entire system and classified as a "system" class.

Partitioned classes, however, split up their objects such that each of their objects can be associated with one system partition at a time. For example, the "Node" class is divided into subsets representing each system partition that contain the node objects for the nodes in that particular system partition.

A node belongs to exactly one system partition and by default accesses only objects in system classes and objects in partitioned classes for its partition. FIG. 3 is indicative of this concept. While nodes 305–316 belong to system partition A at 300, nodes 321–332 belong to system partition B at 360 exclusively. In this way, the view to the SDR is managed such that queries return all data necessary to manage a partition, but not data that pertains to parts of the system that are outside of the partition.

The present invention provides for "persistent" partitioning, meaning that a re-booting of any node or even the entire system unit does not affect the partitioning information as was previously in operation. This will ensure that a partitioned system environment will always re-boot as a partitioned environment, with node and configuration information intact. In this manner, the user does not have to provide information about the system, anew, after a node or system failure.

One way of ensuring a "persistent" partition is to organize the system data provided in the system data repository in a manner that survives a re-booting of the system. A new system class is provided. In one embodiment of the present invention this new class is called a Syspar_map class. The Syspar_map class maintains information about node and sub-environment configurations. After re-boot completion, nodes are provided information about their sub-environment's configuration via the central control element through the use of Syspar_map class. Usually, the nodes need to check their sub-environment's configuration only after a re-boot. At no other time is it necessary for any SDR clients on the node to check the partition that they are in. More on this subject will be discussed later.

Adapter Aliases

In case of multiple environments, each sub-environment constructs a separate view due to differences in data and in accordance with each sub-environment's needs. However, the presentation of multiple views in a single system unit that is only logically partitioned is a challenging task. Solving the problem of multiple views of the data in the SDR leaves the problem of identifying which view should be used in any given query of SDR data.

When there are no logical partitions, each image or view of the system, is identified by the system in a record and provided to any querying node. This record is usually "named" or targeted in a destination address file accessible by the SDR.

In a system that does not support logical partitioning, each node in the MPP system contains the same file with the appropriate record naming the control workstation. SDR clients running on any of the nodes use this file to connect to the SDR on the control workstation. In a system that supports logical partitioning, however, this concept becomes complicated because multiple views have to be provided to different clients or users that are not operating in the same logical partition.

The present invention provides an alias (IP) address of the (control) workstation where the appropriate sub-environment's image or view can be retrieved from. The view for each sub-environment is constructed based on the data provided in the SDR classes. Therefore, it is possible that some functions are replicated in each logical sub-environment, while some other functions that are global maintain their single point of control capabilities on the (control) workstation.

The (IP) address of each (control) workstation providing the corresponding sub-environment's view is stored in a destination information file, on each node. In one embodiment of the present invention this file is named "/etc/SDR_dest_info" file. It is possible to allocate an alias or host-name as well as the (IP) address provided, to clearly define the location where the view or image of the particular sub-environment can be retrieved from. The destination file provides both the (IP) address or the host-name, if used, for the (control) workstation where the SDR for each partition or class resides. Requests are made by the SP sub-environments, nodes or other users (collectively defined hereinafter as clients) using the appropriate identification for each specific desired partition. The name and/or the (IP) address used for the SDR request identifies the system partition to the SDR.

Figure 4:
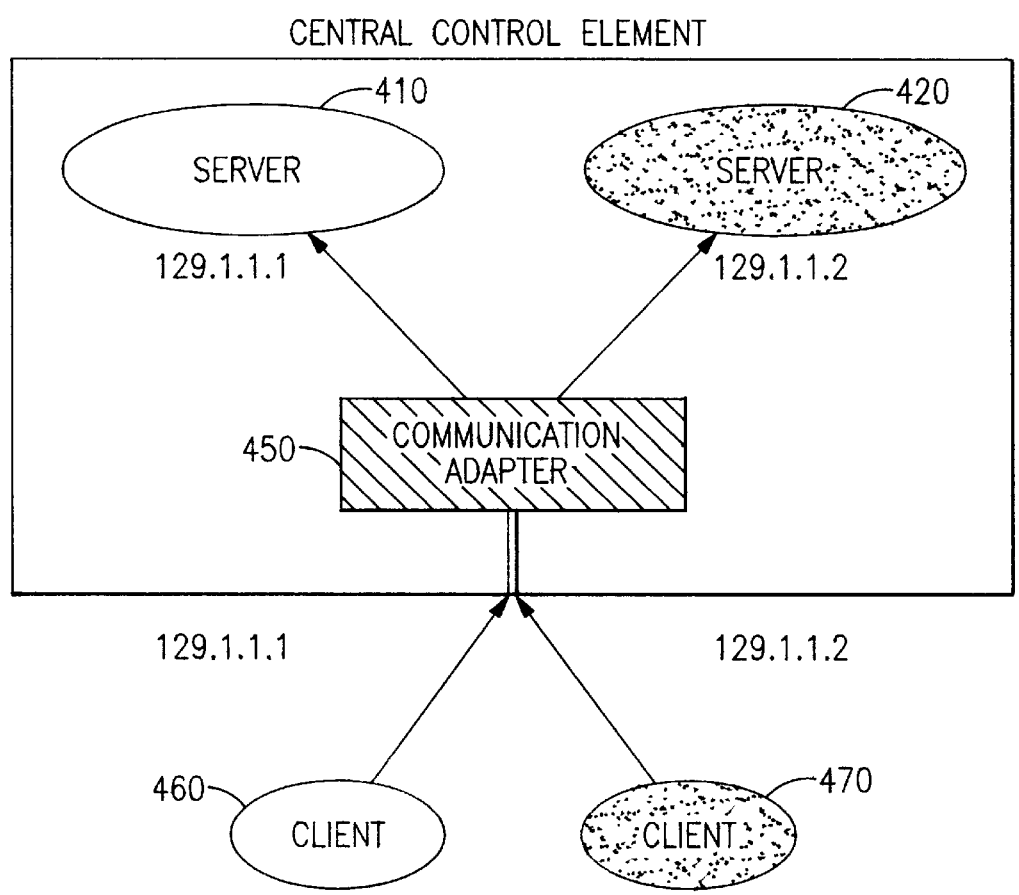
FIG. 4 shows the control element in detail as suggested by one embodiment of the present invention.

When one control workstation has to be apportioned to construct different views corresponding to different sub-environments, usually a network or communication adapter at 450 is used, as illustrated by FIG. 4. In one embodiment, each node is also provided a node adapter to communicate easily with the network and this communication adapter. A host-name or alias is used in such instances. Usually an SP system is defined by its host-name which corresponds to its (IP) address for the adapter that provides the image or the view. An (IP) alias, then, is simply a second (or third, or forth, etc.) IP address that can be given to the same adapter. In this way, the adapter is apportioned to provide different view of each sub-environment. A system partition name is the name that maps to the address of the adapter or alias.

In one embodiment of the present invention, this alias name is the name of an actual adapter alias supported by the operating system. For example in the SP2 system, the adapter alias is supported by AIX, that allows an alternate name and IP address to be assigned to an adapter. FIG. 2 is an illustration of this concept. The IP address of default partition P1 is provided by a separate alias at 215, while the alias IP address of P2 partitioning is provided at 265.

In another embodiment of the present invention, as illustrated in FIG. 4, dedicated servers are provided at 410 and 420, as part of the central control element. At least one server is dedicated to each sub-environment. These servers are in processing communication with the client via the TCP/IP communication manager. The servers fulfill a variety of tasks and functions. For one, the servers are used to allow the dynamic creation of a list of resources, typically a group of nodes, that survive a system shutdown. Therefore a client's sub-environment can be determined from the address provided in the destination address file of the client alone if desired.

Daemons and alias names

A daemon in the AIX and UNIX based environments is a program that runs unattended to perform a standard service. Some daemons are triggered automatically while others are triggered periodically. Daemon processes generally provide services that must be available at all times.

In one embodiment of the present invention, for every partition defined, there is a dedicated SDR daemon started on the control workstation. This dedicated daemon is responsible for deciphering and returning all information that may be useful to the partition the daemon is assigned to. In other words, the daemon is programmed to bind to the port and address of the server as provided by the sub-environment. The daemon is provided the specific (IP) address of the partition so that it can "listen" in on this specific address in order to obtain the required information. The act of "listening" is similar to a deciphering function. Each daemon will review information and decipher those relating to its partition and provides it to the sub-environment it services. Therefore, all information from "system" classes as well as information that specifically pertains to the "partitioned" classes the daemon is servicing will be passed along to the daemon's sub-environment.

Other daemons in the SP2 that run on the control workstation use the same technique described above for differentiating among client requests from different partitions. The general strategy is for the daemon to acquire the partition's address and then "listen" on this specific address, often on the same "well-known port" used by all other daemon's.

Clients on any (SP2) node use the destination file (/etc/SDR_dest_info file) to find specific address of the daemon that the partition is using. In this way the client does not need to know that partitions exist. The daemon in turn will pass along all appropriate information. (The daemon that had been listening on the address serves only its partition and will return information appropriate to that partition alone.) Using (IP) addresses to distinguish system partitions, allows multiple daemons with the same name and function to be able to run on the same control workstation and using the same well-known port at the same time. This greatly contributes to the ability of a system partition to be viewed as a "logical (SP2) system", because it appears that each daemon is running on its own control workstation. Further, having each daemon use the same well-known port is consistent with typical UNIX port usage, and eliminates complicated algorithms for finding free port addresses.

Persistent Systems—Ability to recover from a Shutdown

Any requests made to the SDR from the clients of an MPP system must have a guaranteed path to the SDR. The destination information file (/etc/SDR_dest_info file) on each node provides this information. The first record of this file contains the destination information that the SDR client interface uses by default if the destination information is not provided as part of the request itself. This record is set during the original booting of the node to the system partition identifier for that node. Since it is possible that this destination identifier is no longer valid (if the destination of a node has been deleted because of node failure or unavailability and the destination has been assigned to a different partition in the mean time), a second record containing the destination for the "persistent" system partition is used by the boot script to access the SDR to find out what the first record of the destination information file (/etc/SDR_dest_info file) should be set to. This concept is illustrated in FIG. 3 at 301 and 319.

Furthermore, as explained earlier a new global or system class has also been implemented. In one embodiment of the present invention this new class is named Syspar_map class which is accessible to any system partition and which provides a mapping of node numbers to system partition names. The Syspar_map class is also used as part of configuring the control workstation, since it contains a mapping of all nodes in the system to their partition IP addresses and host-names. Through the use of the Syspar_map class in the SDR, each node discovers the partition that it belongs to when it boots. The partition name is stored in the destination information (/etc/SDR_dest_info) file. At no other time is it necessary for any SDR clients on the node to check the partition that they are in. They are automatically routed to the correct SDR daemon which will only return information about that partition, and at most some common data from the system classes. In this way, the system management code, vendor code, and application code all use the appropriate "partition view" transparently.

Adding and Deleting System Resources

Nodes and other resources such as switches can be added and/or deleted from the system unit dynamically. When a resource is either added or deleted, the SDR and the central control element update all files, including the data stored in the SDR classes to accommodate resource changes. When a resource is being added, the resource will be added to default sub-environment if no other particular sub-environment is defined. Similarly, in case of an error or node failure, nodes can become inactive or intentionally dropped from a sub-environment. Furthermore, the user may decide to redefine the shape of the sub-environments by swapping nodes between sub-environments, or even creating new sub-environments. All such changes can be successfully accomplished through the central control element. The central control element will update the configuration data, all data in the SDRs and all other related information to reflect any such changes.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a Unix based distributed parallel processing environment operating initially as a single computing unit and having a plurality of nodes connected via a network to one another and to a central control element used for controlling communications, said environment being selectively partitioned into at least two isolated sub-environments, a method of deciphering all communications for a given sub-environment, said method comprising the steps of:

storing all system data in a repository in said central control element;

organizing said stored data accordingly, so that each sub-environment has its own exclusive data;

apportioning said central control element so that each of said sub-environments are assigned to a separate portion of said control element, each portion of said control element containing data pertaining to its respective sub-environment;

creating a destination file in each node, said file containing address of portion of said control element dedicated to said node's respective sub-environment;

starting a dedicated daemon in said control element for each sub-environment, said daemon being provided said address of its respective sub-environment's portion in said central control element; and said daemon listening in on said address provided and deciphering only messages relating to its sub-environment.

2. The method of claim 1, wherein said central control element has at least one communication adapter, and said adapter is apportioned for providing each sub-environment's data and corresponding view.

3. The method of claim 2, wherein said control element has at least one dedicated server per sub-environment.

4. The method of claim 3, wherein said daemon after deciphering all communications relating to its sub-environment, returns said information to its dedicated sub-environment.

5. The method of claim 4, wherein said daemon binds to its respective server dedicated for its respective sub-environment.

6. The method of claim 5, wherein said network is an ethernet using TCP/IP protocol.

7. The method of claim 1, wherein said central control element recognizes sub-environment of each node by looking at said address provided in said client's destination file.

8. The method of claim 6, wherein said central control element recognizes sub-environment of each node by looking at said host-name and alias provided in said client's destination file.

9. The method of claim 1, wherein said environment is partitioned into a plurality of sub-environments.

10. The method of claim 6, wherein said environment is partitioned into a plurality of sub-environments.

* * * * *